United States Patent [19]
Roinick, Sr.

[11] Patent Number: 5,398,718
[45] Date of Patent: Mar. 21, 1995

[54] TAP LINE PLIERS

[76] Inventor: Michael J. Roinick, Sr., R.R. 1, Box 1154, Nescopeck, Pa. 18635

[21] Appl. No.: 205,556

[22] Filed: Mar. 4, 1994

[51] Int. Cl.6 .................... F16L 41/06; B21D 28/28; B25B 7/22
[52] U.S. Cl. ........................ 137/318; 30/94; 72/325; 72/409; 72/413; 72/473; 81/421; 81/422; 83/745; 222/83
[58] Field of Search ............... 137/231, 238, 315, 317, 137/318; 81/418, 421, 422, 423, 424, 424.5, 426, 426.5; 222/5, 81, 82, 83, 83.5, 88, 89, 505, 517; 30/92, 94; 72/325, 409, 410, 413, 473; 83/54, 745

[56] References Cited

U.S. PATENT DOCUMENTS

| | | | |
|---|---|---|---|
| 1,266,192 | 5/1918 | Anthony | 137/231 |
| 1,709,794 | 4/1929 | Konzelman | 81/424.5 |
| 2,106,671 | 1/1938 | Watson | 137/232 |
| 2,229,379 | 1/1941 | Keefe | 137/232 |
| 2,725,774 | 12/1955 | Tekse | 81/423 |
| 3,395,724 | 8/1968 | Hamel | 137/318 |
| 3,450,149 | 6/1969 | Brinda | 137/318 |
| 3,648,725 | 3/1972 | Strybel | 137/318 |
| 3,698,419 | 10/1972 | Tura | 137/318 |
| 3,788,345 | 1/1974 | Tura | 137/318 |
| 5,301,532 | 4/1994 | Bickmore et al. | 137/318 |

*Primary Examiner*—George L. Walton

[57] ABSTRACT

Tap line pliers for removing refrigerant from a line of a refrigeration system comprising a set of pliers having jaws at one end and opposed handles at the other end; a platform mechanism coupled within the jaws of the pliers, the platform mechanism adapted for holding a line placed thereon for tapping; a tapping mechanism coupled within the jaws of the pliers, the tapping mechanism adapted for tapping a line held on the platform mechanism; and a valve mechanism coupled to the tapping mechanism, the valve mechanism being adapted for draining a tapped line.

3 Claims, 3 Drawing Sheets

TAP LINE PLIERS

BACKGROUND OF THE INVENTION

1. Field of the Invention

The present invention relates to tap line pliers and more particularly pertains to removing refrigerant from a line of a refrigeration system with tap line pliers.

2. Description of the Prior Art

The use of clamping devices is known in the prior art. More specifically, clamping devices heretofore devised and utilized for the purpose of removing refrigerant from refrigeration systems are known to consist basically of familiar, expected and obvious structural configurations, notwithstanding the myriad of designs encompassed by the crowded prior art which have been developed for the fulfillment of countless objectives and requirements.

By way of example, Mullins U.S. Pat. 3,448,758 discloses a refrigerant service valve; Roven U.S. Pat No. 3,817,271 discloses a refrigeration by-pass and service valve; U.S. Pat. No. 3,916,642 discloses a refrigerant dryer service valve; Snyder U.S. Pat. No. 4,611,624 discloses a line piercing valve assembly; and Furmanek U.S. Pat. No. 5,025,633 which discloses a CFC recycling system.

While these devices fulfill their respective, particular objective and requirements, the aforementioned patents do not describe tap line pliers that clamp and lock onto refrigerant lines for tapping, tap refrigerant lines for subsequent draining, and allow an external recovery system to be coupled thereto for collecting refrigerant.

In this respect, the tap line pliers according to the present invention substantially departs from the conventional concepts and designs of the prior art, and in doing so provides an apparatus primarily developed for the purpose of removing refrigerant from a line of a refrigeration system.

Therefore, it can be appreciated that there exists a continuing need for new and improved tap line pliers which can be used for removing refrigerant from a line of a refrigeration system. In this regard, the present invention substantially fulfills this need.

SUMMARY OF THE INVENTION

In the view of the foregoing disadvantages inherent in the known types of clamping devices now present in the prior art, the present invention provides improved tap line pliers. As such, the general purpose of the present invention, which will be described subsequently in greater detail, is to provide new and improved tap line pliers and a method which have all the advantages of the prior art and none of the disadvantages.

To attain this, the present invention essentially comprises, in combination, a set of pliers having opposed upper and lower jaws at one end and opposed handles at the other end. One handle has an adjustment screw disposed therein for allowing adjustment of the separation distance between the jaws when the screw is rotated inwards or outwards. The other handle has a locking lever coupled thereto for locking the jaws in a fixed orientation in one position and releasing the jaws for reciprocal movement in another position. A platform is included and is adapted for holding a line of a refrigeration system thereon for tapping. The platform includes an essentially planar base coupled within the lower jaw of the pliers. The platform further includes an upwardly extending mounting block centrally disposed thereon. The mounting block has a threaded mounting hole disposed therethrough and extension means coupled thereon for raising or lowering the height of the mounting block. The platform further includes a pair of beveled blocks coupled to the base on opposite sides of the mounting block with the beveled blocks and mounting block creating a V-shaped seat therebetween adapted for holding a refrigeration line thereon. Each beveled block has a threaded mounting hole disposed therethrough. The platform also includes a pair of threaded bolts. Each bolt is threadably coupled through the mounting hole of a beveled block and to the mounting hole of the mounting block, whereby allowing axial adjustment of the position of the beveled block disposed thereon, thus allowing the size of the V-shaped seat to be increased or decreased. A valve assembly is included. The valve assembly is adapted for tapping and draining a line of a refrigeration system held by the platform. The valve assembly includes a housing. The housing includes a bore disposed therethrough, two opposed lugs extending therefrom, and a concave cut-out formed thereon between the lugs with the cut-out adapted for holding a refrigerant line therein. The valve assembly includes a gasket coupled to the cut-out and aligned with the bore with the gasket adapted for preventing leakage from a tapped refrigeration line. The valve assembly includes a needle adapted for tapping a refrigeration line disposed within the bore with the needle including a conical tip adapted for piercing a refrigeration line, a threaded base end extending from the housing adapted to be coupled to an external cable connector of a refrigeration line, a cavity formed in the base end, a first channel axially disposed from the base end to the cavity, thus allowing communication therebetween, and a second channel axially disposed from the cavity to the tip end, thus allowing communication therebetween. The valve assembly includes a valve disposed within the cavity. The valve has a gasket disposed adjacent to the base end and aligned with the first channel, a ball disposed adjacent to the gasket, and a spring for urging the ball towards the gasket. The valve provides one orientation for preventing communication through the needle when the ball is urged against the gasket and another orientation allowing communication through the needle when the ball is urged away from the gasket. A pair of elongated retainer brackets is included. Each retainer bracket has one end coupled to the upper jaw of the pliers and the other end coupled to a lug of the housing, whereby positioning the valve assembly directly above the platform in an aligned configuration, thus allowing the pliers to apply a clamping force to tap a refrigerant line when placed therebetween.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new and improved tap line pliers which have all the advantages of the prior art clamping devices and none of the disadvantages.

It is another object of the present invention to provide new and improved tap line pliers which may be easily and efficiently manufactured and marketed.

It is a further object of the present invention to provide new and improved tap line pliers which is of durable and reliable construction.

An even further object of the present invention is to provide new and improved tap line pliers which is susceptible of a low cost of manufacture with regard to both materials and labor, and which accordingly is then susceptible of low prices of sale to the consuming public, thereby making such a tap line pliers economically available to the buying public.

Still yet another object of the present invention is to provide new and improved tap line pliers which provides in the apparatuses and methods of the prior art some of the advantages thereof, while simultaneously overcoming some of the disadvantages normally associated therewith.

Even still another object of the present invention is to provide new and improved tap line pliers for removing refrigerant from a line of a refrigeration system.

Lastly, it is an object of the present invention to provide new and improved tap line pliers comprising a set of pliers having jaws at one end and opposed handles at the other end; platform means coupled within the jaws of the pliers for holding a line thereon for tapping; tapping means coupled within the jaws of the pliers for tapping a line held by the platform means; and valve means coupled to the tapping means for draining a tapped line.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
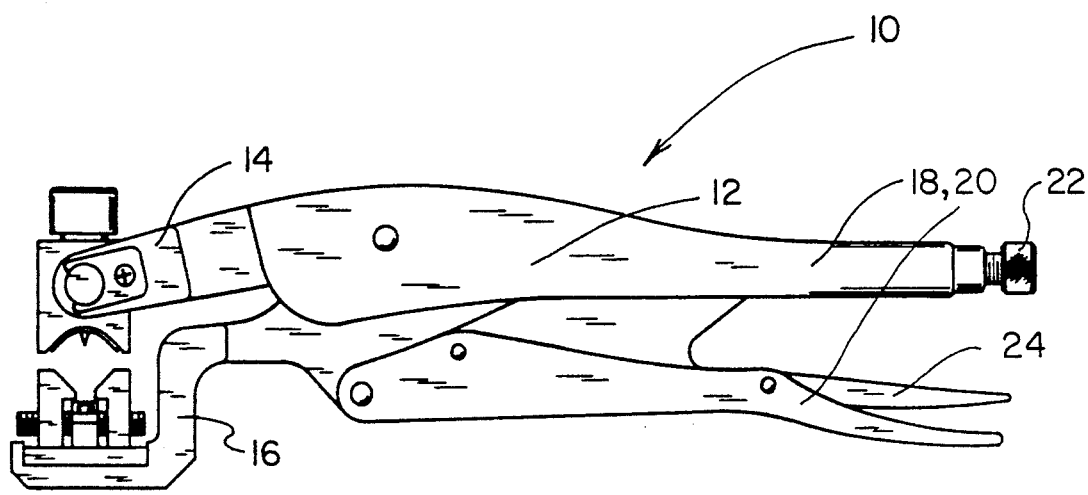
FIG. 1 is a side elevational view of the preferred embodiment of the tap line pliers constructed in accordance with the principles of the present invention.
Figure 2:
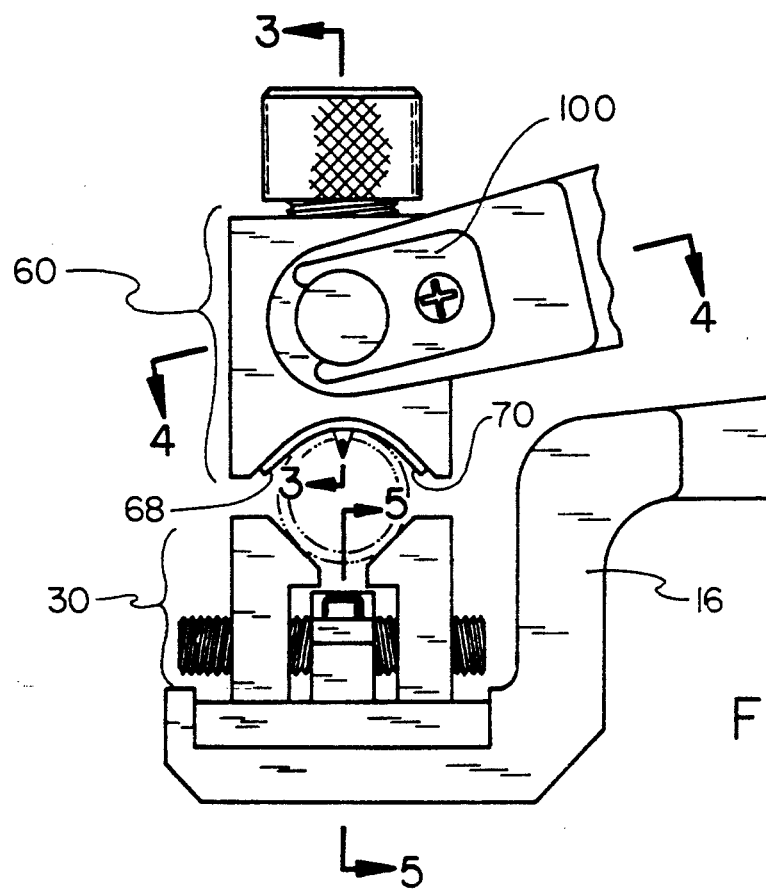
FIG. 2 is an enlarged side elevational view of the jaws of the present invention.
Figure 3:
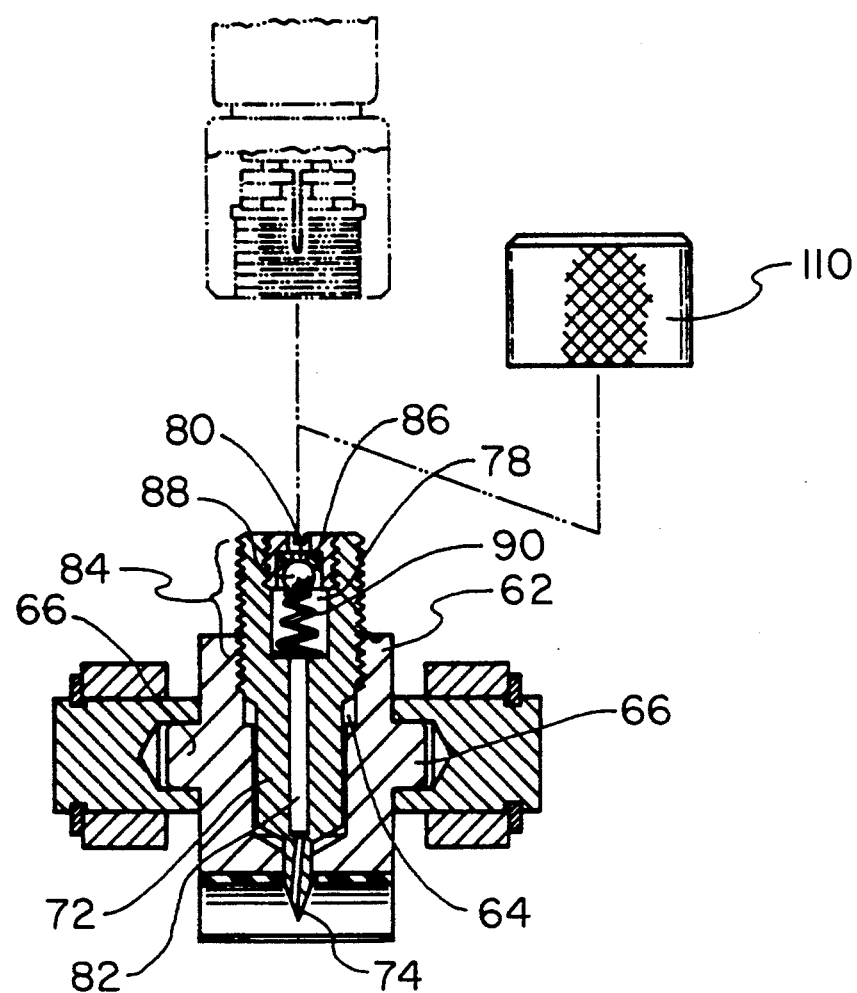
FIG. 3 is an exploded cross sectional view of the valve assembly taken along the line 3—3 of FIG. 2.
Figure 4:
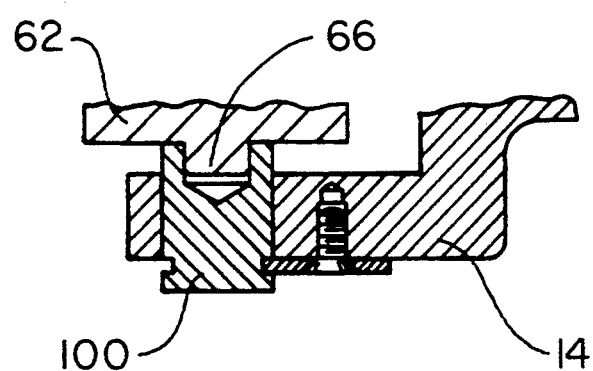
FIG. 4 is an enlarged cross sectional view of a retainer brackets taken along the line 4—4 of FIG. 2.
Figure 5:
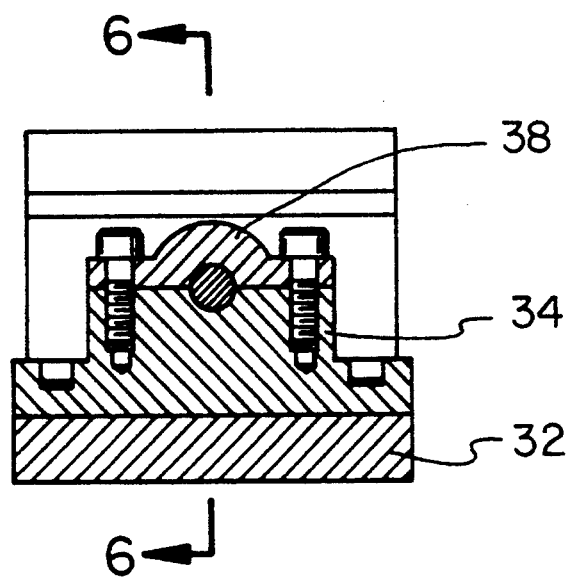
FIG. 5 is an enlarged cross sectional view of the mounting block of the platform taken along the line 5—5 of FIG. 2.
Figure 6:
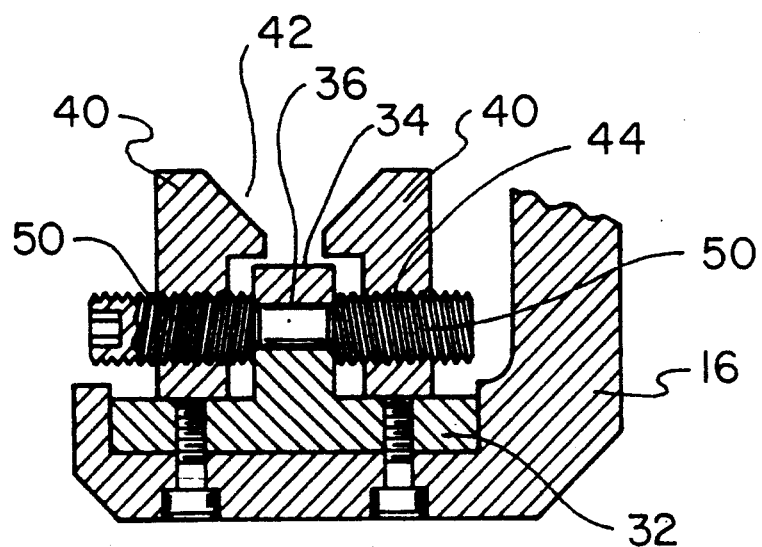
FIG. 6 is an enlarged cross sectional view of the platform taken along the line 6—6 of FIG. 5.

With reference now to the drawings, and in particular, to FIG. 1 thereof, the preferred embodiment of the new and improved tap line pliers embodying the principles and concepts of the present invention and generally designated by the reference number 10 will be described.

Specifically, the present invention includes four major components. The major components are the pliers, platform, valve assembly, and retainer brackets. These components are interrelated to provide the intended function.

More specifically, it will be noted in the various Figures that the first major component is the pliers 12. The pliers have opposed upper and lower jaws 14, 16 at one end and opposed handles 18, 20 at the other end. One handle has an adjustment screw 22 disposed therein for allowing adjustment of the separation distance between the jaws when the screw is rotated inwards or outwards. The other handle has a locking lever 24 coupled thereto for locking the jaws in a fixed orientation in one position and releasing the jaws for reciprocal movement in another position.

The second major component is the platform. The platform is used to hold a line of a refrigeration system thereon for tapping. The platform has-an essentially planar base 32. The base is coupled within the lower jaw 16 of the pliers.

The platform includes an upwardly extending mounting block 34 centrally disposed thereon. The mounting block has a threaded mounting hole 36 disposed therethrough. The mounting block also has extension means 38 coupled thereon for raising or lowering the height of the mounting block.

The mounting block includes a pair of beveled blocks 40 coupled to the base on opposite sides of the mounting block 34. The beveled blocks in combination with the mounting block create an essentially V-shaped seat 42 therebetween. This seat is used to hold a refrigeration line thereon. Each beveled block further includes a threaded mounting hole 44 disposed therethrough.

Furthermore, the platform includes a pair of threaded bolts 50. Each bolt is threadably coupled through the mounting hole 44 of the beveled block and to the mounting hole 36 of the mounting block. This coupling allows axial adjustment of the position of each beveled block disposed on the platform. By adjusting the beveled blocks in relation to the mounting block, the size of the V-shaped seat can be increased or decreased for holding different sized refrigerant lines.

The third major component is the valve assembly 60. The valve assembly is used for tapping and draining a line of a refrigeration system held on the platform. The valve assembly has a housing 62 including a bore 64 disposed therethrough. The housing includes two opposed lugs 66 extending therefrom. The housing also includes a concave cutout 68 formed thereon between the lugs for holding a refrigerant line therein.

A gasket 70 is also coupled within the cutout of the housing. It is aligned with the bore 64. The gasket is adapted to prevent leakage from a tapped line.

Furthermore, the valve assembly also includes a needle 72. The needle is used for tapping a refrigeration line held by the platform when clamped by the pliers. The needle is disposed within the bore of the housing. The needle includes a conical tip end 74 for piercing a refrigeration line, and a threaded base end 76 extending from the housing. The base end is adapted to be coupled to an external cable connector of a refrigeration line evacuation system.

Furthermore, with respect to the needle, a cavity 78 is formed in the base end. A first channel 80 is axially disposed from the base end 76 to the cavity. This allows communication between the base end and the cavity. A second channel 82 is axially disposed within the needle from the cavity to the tip end 74. This allows communication between the cavity and the tip end.

Furthermore, with respect to the value assembly, a valve 84 is disposed within the cavity 78 of the needle. The valve has a gasket 86 disposed adjacent to the base end 76. The gasket is aligned with the first channel 80 within the needle 72. A ball 88 is disposed adjacent to the gasket. The ball serves to open and close the valve. A spring 90 is disposed within the cavity and is used to urge the ball towards the gasket. In this configuration, the valve provides one orientation for preventing communication through the needle when the ball is urged against the gasket. The valve also provides another orientation allowing communication through the needle when the ball is urged away from the gasket.

The fourth major component is the pair of retainer brackets 100. Each retainer bracket has one end coupled to the upper jaw 14 of the pliers and the other end coupled to a lug 66 on the housing 62. The retainer brackets are used to hold and position the valve assembly 60 directly above the platform 30 in an aligned configuration. This allows the pliers to apply a clamping force to the platform and valve assembly to tap a refrigerant line placed therebetween.

A second embodiment of the present invention includes essentially all of the components of the present invention including a cap 110. The cap is coupled to the valve assembly 60 at the base end 76 of the needle. The cap is coupled to the valve assembly for preventing a tapped line from draining. The cap is used to prevent drainage from the valve assembly when an external connector from a refrigerant evacuation system is not coupled to a tapped line.

In the preferred embodiment, the major components are made of metal or any other rigid material. The present invention is intended to be used primarily by air conditioning and refrigeration field service technicians. Besides allowing a technician to remove refrigerant such as freon gas from a refrigeration system, the present invention can be used to quickly and easily install a tap valve. The present invention is also adapted to be coupled with gauges, hoses, and vacuum pumps.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. Tap line pliers for removing refrigerant from a line of a refrigeration system comprising, in combination:

a set of pliers having opposed upper and lower jaws at one end and opposed handles at the other end, one handle having an adjustment screw disposed therein for allowing adjustment of the separation distance between the jaws when the screw is rotated inwards or outwards, the other handle having a locking lever coupled thereto for locking the jaws in a fixed orientation in one position and releasing the jaws for reciprocal movement in another position;

a platform adapted for holding a line of a refrigeration system thereon for tapping, the platform having:

an essentially planar base coupled within the lower jaw of the pliers;

an upwardly extending mounting block centrally disposed with respect to said platform and said base, the mounting block having a mounting hole disposed therethrough and extension means coupled thereon for raising axed lowering the height of the mounting block;

a pair of beveled blocks coupled to the base and slidable along a surface thereon on opposite sides of the mounting block with the beveled blocks and mounting block creating a V-shaped seat therebetween adapted for holding a refrigeration line thereon, each beveled block having a threaded mounting hole disposed therethrough; and a pair of threaded bolts, each bolt threadably coupled through the mounting hole of each beveled block and through the mounting hole of the mounting block, whereby rotation of the threaded bolts within said threaded holes allows axial adjustment and spacing of the pair of beveled blocks on opposite sides of the upwardly/extending mounting block to allow for the V-shaped seat to vary in size to accommodate different size refrigerant lines upon the raising and lowering of the height of the mounting block;

a valve assembly adapted for tapping and draining a line of a refrigeration system held by the platform, the valve assembly having:

a housing including a bore disposed therethrough, two opposed lugs extending therefrom, and a concave cut-out formed thereon between the lugs, the cut-out adapted for holding a refrigerant line therein;

a gasket coupled to the cut-out and aligned with the bore, the gasket adapted for preventing leakage from a tapped refrigeration line;

a needle adapted for tapping a refrigeration line disposed within the bore, the needle including a conical tip adapted for piercing a refrigeration line, a threaded base end extending from the housing adapted to be coupled to an external cable connector of a refrigeration line, a cavity formed in the base end, a first channel axially disposed from the base end to the cavity, thus allowing communication therebetween, and a second channel axially disposed from the cavity to the tip end, thus allowing communication therebetween;

a valve disposed within the cavity, the valve having a gasket disposed adjacent to the base end and aligned with the first channel, a ball disposed adjacent to the gasket, and a spring for urging the bail towards the gasket, the valve providing one orientation for preventing communication through the needle when the ball is urged against the gasket and another orientation allowing communication through the needle when the ball is urged away from the gasket; and a pair of elongated retainer brackets, each retainer bracket having one end coupled to the upper jaw of the pliers and the other end coupled to a lug of the housing, whereby positioning the valve assembly directly above the platform in an aligned configuration, thus allowing the pliers to apply a clamping force to tap a refrigerant line when placed therebetween.

2. Tap line pliers for removing refrigerant from a line of a refrigeration system comprising:

a set of pliers having opposed upper and lower jaws :at one end and opposed handles at the other end;

platform means coupled within the jaws of the pliers, the platform means adapted for holding a line placed thereon for tapping, the platform means having an essentially planar base coupled within the lower jaw of the pliers;

an upwardly extending mounting block centrally disposed with respect to said platform and said base, the mounting block having a mounting hole disposed therethrough and extension means coupled thereon for raising and lowering the height of the mounting block;

a pair of beveled blocks coupled to the base and slidable along a surface thereon on opposite sides of the mounting block with the beveled blocks and mounting block creating a V-shaped seat therebetween adapted for holding a refrigeration line thereon, each beveled block having a threaded mounting hole disposed therethrough; and a pair of threaded bolts, each bolt threadably coupled through the mounting hole of each beveled block and through the mounting hole of the mounting block, whereby rotation of the threaded bolts within said threaded holes allows axial adjustment and spacing of the pair of beveled blocks on opposite sides of the upwardly extending mounting block to allow for the V-shaped seat to vary in size to accommodate different size refrigerant lines upon the raising and lowering of the height of the mounting block;

tapping means coupled within the jaws of the pliers, the tapping means adapted for tapping a line held on the platform means; and valve means coupled to the tapping means, the valve means being adapted for draining a tapped line.

3. The device as set forth in claim 2 further including locking means coupled to the pliers, the locking means adapted for locking the jaws at a set position to a line.

* * * * *